3,356,451
METHOD FOR PRODUCING MOLECULAR SIEVE ZEOLITE PARTICLES
Edward Michalko, Chicago, Ill., assignor to Universal Oil Products Company, Des Plaines, Ill., a corporation of Delaware
No Drawing. Filed Mar. 14, 1966, Ser. No. 533,866
10 Claims. (Cl. 23—112)

ABSTRACT OF THE DISCLOSURE

Production of crystalline zeolite by mild acid washing of silica hydrogel particles prepared from silica sol containing hexamethylenetetramine, drying and calcining and treating the resultant silica particles with alkali metal aluminate solution.

---

This application is a continuation-in-part of my copending application Ser. No. 359,414, filed on Apr. 13, 1964.

This invention relates to an improvement in the manufacture of molecular sieves to produce a sieve which has a high rate of exchange of normal hydrocarbons through the pore entrances. More specifically, this invention relates to an improvement in the manufacture of molecular sieves by converting a refractory oxide particle to a binderless zeolite particle in which the density of the refractory oxide particle is controlled to produce a high rate low density zeolite. Still more specifically, this invention relates to lowering the density of a silica particle which comprises mixing a silica sol with a base releasing gelling agent, forming the mixture into a hydrogel particle, contacting the hydrogel particle with an acid of mild concentration in a washing step, drying and calcining the hydrogel particle to form a refractory oxide particle and thereafter contacting the low density refractory oxide particle with a treating solution containing alkali metal cations and anions selected from the group consisting of silicate, aluminate and hydroxyl and thereby converting the refractory oxide particle to a high exchange rate zeolite particle.

In one of its embodiments, this invention relates to a method of producing a binderless high rate synthetic zeolite having a spherical shape which comprises:

mixing together an aqueous silica solution, an aqueous acid selected from the group consisting of hydrochloric and sulfuric acid and an aqueous hexamethylenetetramine solution;

forming spherically shaped hydrogel particles from the mixture;

contacting the hydrogel particles with a dilute acid in a mild acid washing step;

drying and calcining the resulting hydrogel particles to form low density solid spherically shaped silica particles;

bringing the silica particles into contact with an aqueous treating solution containing alkali metal cations and aluminate anions, the composition and amount of the treating solution being established in relation to the weight of silica particles to incorporate sufficient alumina in the finished zeolite to attain a silica/alumina weight ratio of from about 46/54 to about 55/45; and maintaining said particles in contact with the treating solution until the particles are substantially converted to spherically shaped zeolite particles.

Molecular sieves have become increasingly important in the field of adsorbents in the past few years. The sieves are of crystalline structure having many small cavities connected by still smaller pore entrances of uniform size. These pores may vary in size from 3 Angstrom units up to 12 or 15 Angstrom units. However, a particular molecular sieve material desirably will have a uniform pore size. These crystalline aluminosilicate materials are chemically similar to clays and feldspars and belong in the class of materials called zeolites. Zeolites vary somewhat in composition although they generally contain aluminum, silicon, oxygen and an alkali and/or alkaline earth metal. The zeolites may be dehydrated without destruction of the crystal structure, leaving an interlaced rigid crystal structure of regularly spaced channels.

There are a number of commercially available synthetic molecular sieves, each having a particular pore size. It is within the scope of this invention to produce all of these synthetic types such as, for example, Type A, Type U, etc., as well as natural occurring zeolites such as faujasite, mordenite, etc., by the method herein disclosed. Molecular sieves are useful in many applications such as the drying of various fluids and separating hydrouarbon molecules either by polarity or by molecular size selectivity. In this latter mentioned application the molecular sieves having pore entrance sizes of about 5 Angstrom units can separate straight chain paraffins from branched chain paraffins and cyclic analogs by selective sorption of the straight chain molecules. This application can be used to upgrade the octane number of a gasoline hydrocarbon mixture by removing therefrom the straight chain paraffins which have a low octane number.

The method herein described may be used to produce alkaline earth metal zeolites by one additional step, namely, the replacement of alkali metal ions with alkaline earth metal ions after the alkali metal zeolite has been produced. This can be accomplished by well-known methods of ion exchange as, for example, soaking the alkali metal zeolite particles in a finishing solution containing the desired alkaline earth metal ions. Thus, for example, the method of this invention can produce 4A or 5A (where A represents Angstrom units) molecular sieves of a predetermined size and shape by contacting low density silica particles of said predetermined size and shape with an aqueous solution of sodium aluminate and maintaining the particles in contact until the particles have been substantially converted to solid zeolite particles having a 4A size. The 4A zeolite particles may thereafter be ion exchanged with a solution containing calcium ions to produce a 5A zeolite. Likewise the zeolite may be converted to the hydrogen form by ion exchange with ammonium ions followed by thermal treatment (350° C. to 550° C.) to decompose the ammonium ions. The hydrogen form of some of these zeolites possess high catalytic activity. It has been found that when employing a high density silica particle having an apparent bulk density (ABD) of from about 0.44–0.50 gm./cc. and converting said particle to a zeolite, the resulting finished zeolite will have an ABD in excess of 1.0 gm./cc. Although these sieves are very strong and sturdy, they have a very slow exchange rate for exchanging one normal paraffin with another. This exchange rate is of course essential in processes employing zeolites to separate out normal paraffins from hydrocarbon feed mixtures and is typically accomplished by contacting the sieves loaded with feed normal paraffins with a desorbent and displacing the feed normal paraffins with the desorbent normal paraffins. The desorbent typically is a hydrocarbon stream sufficiently different in boiling point from the feed as to render the feed components easily separatable from the desorbent components by ordinary fractionation.

I have found that the rate of exchange of feed normal paraffins with desorbent normal paraffins is dependent among other things upon the structure of the molecular sieves and if the density of the sieve becomes too high the exchange rate sharply decreases. It is desirable to utilize a stable high exchange rate molecular sieve to be able to economically separate normal paraffins from hydrocarbon mixtures. On the other hand if the density of the sieve becomes too low, then although the exchange rate may be high, the strength of the sieve particles will become so low as to render the sieve fragile and easily crushed which is also undesirable in commercial separation processes. Accordingly, it becomes a balance between the two extremes to produce an efficiently functioning zeolite.

The molecular sieves may be employed both in fluid bed and in fixed bed processes. In either case the sieves are desired in the form of discrete particles rather than powdered masses. In fixed bed processes, sieves of from 8 mesh to 70 mesh in size are preferable whereas in fluid processes sorbents of from 100 to 200 or even 350 mesh in size are preferable. Some gas treating beds of sieves employ very coarse size particles in the 4 to 10 mesh size range. The use of particles in substantially spherical shape offers numerous advantages, particularly when the particle is used as an adsorbent, treating, refining or purifying agent or as a catalyst or component of a catalyst for the conversion of organic compounds and still more particularly for the conversion or separation of hydrocarbons. When used as a fixed bed of packing material in a reaction or adsorption contacting zone, the spherical shaped particles permit more uniform packing and thereby reduce variations in pressure drop through the bed and accordingly reduce channeling which otherwise results in a portion of the bed being bypassed. Another advantage in the use of particles of spherical shape is that the spheres contain no sharp edges to break or wear off during processing or handling and therefore reduce the tendency to plug the process equipment. These advantages are magnified when the particles are used as a moving or fluid bed, that is, when the particles are transported from one zone to another by either the reactants or by an extraneous carrying medium. It is thus seen that the use of particles in this shape permits a more effective utilization of these particles.

Present methods of producing synthetic zeolites are not satisfactory in producing particles of desired shape, size and uniformity of exchange rates. Typically, prior art methods produce synthetic zeolites in a finely divided powdered form in sizes ranging from 0.5 to 5 microns. In order to obtain the zeolites in a useful size, the powdered zeolite is agglomerated with a binder such as clay to produce particles of desired size. These particles are typically produced in pellets or beads of non-uniform size, shape and performance characteristics by methods such as extrusion. In order that the particles be of sufficient hardness, binders up to 20 or more weight percent of the total particle are employed. This results in a heterogeneous mixture of zeolite and binder in which the binder contributes nothing to the zeolite particle as a sorbent but instead occupies valuable space in the particle. Probably the binder results in poorer zeolite particles as the binder may tend to plug some of the pores and otherwise interfere with the sorbent activity. The method of this invention can produce high exchange rate synthetic zeolites of any desired size and shape without the use of binders.

It is an object of this invention to produce a high exchange rate binderless synthetic zeolite of any desired size and shape.

It is another object of this invention to control the density of the finished zeolite and thereby control its exchange rate.

It is a more specific object of this invention to prepare a binderless, high exchange rate zeolite particle from a silica particle in which the density of the silica particle is controlled thereby to produce the zeolite of desired density.

These and other objects will become more apparent in the light of the following detailed description.

One of the starting materials in the process of this invention are solid particles of desired size and shape composed of silica. Typically silica hydrogel particles can be produced by contacting water glass or silica frits with water to produce an aqueous solution containing about 16% silica. This solution is added to an acid such as HCl or $H_2SO_4$ to give a silica sol having a pH of less than 4. Hexamethylenetetramine (HMT) is added to the silica sol and the resulting mixture is dropped in discrete particles to form hydrogel particles. Various dropping techniques such as vibration are well known to produce spherical hydrogel particles of desired size. The hydrogel particles are aged typically at temperatures in the range of 90° C. to 150° C. in the forming oil.

The silica hydrogel particles are thereafter subjected to a mild acid washing step. It has been unexpectedly found that using a base releasing gelling agent in the formation of the silica hydrogel particle followed by mild acid washing of said particle results in a calcined particle of lower ABD. Preferably, the zeolites are prepared by first forming silica particles and using a sodium aluminate treating solution. It has been found that if either the base releasing gelling agent is omitted or the mild acid washing step is omitted, the resulting calcined silica particles have a sufficiently high ABD so that when they are ultimately converted to a zeolite, the exchange rate for normal paraffins is slow. It has been found that incorporating a base releasing gelling agent into the silica sol, dropping the silica sol into the forming oil, separating the resulting dropped hydrogel particles from the forming oil and washing said particles with a mild acid solution will produce a calcined silica particle having an ABD of from 0.35 up to about 0.40 gm./cc. This ABD range is sufficiently low to produce zeolite particles having a proper ABD so that said zeolite particle possesses both adequate strength as well as high exchange rates.

An example of a preferable base releasing gelling agent is hexamethylenetetramine hereinafter referred to as HMT. At room temperature this material is stable but when exposed to elevated temperatures, it will decompose giving off the base ammonia. Preferably, the gelling agent is mixed in the liquid phase with the sol prior to formation of hydrogel particles in order to efficiently disperse said agent throughout the sol. Preferably, the HMT is diluted in water to a concentration of about 28 wt. percent and sufficient diluted HMT is added to the sol to attain a concentration of from about 10 to about 15 grams of pure HMT per 100 grams of $SiO_2$. This resulting mixture is preferably formed into hydrogel particles by dropping the sol in discrete particles into forming oil maintained at a temperature of about 95° C. by techniques such as forcing the sol and HMT through a vibrating nozzle. The particles are thereupon aged in forming oil for several hours and finally separated from said oil. The hydrogel particles are thereafter subjected to a mild acid wash. This mild acid washing step in combination with the use of said base releasing gelling agent is responsible for the production of relatively low density calcined silica particles. The mild acid wash is carried out at temperatures above 50° C. and preferably about 95° C. for a period of time of from about 1 hour up to about 24 hours. The term mild acid wash refers to the concentration of acid in the wash solution and it is intended to mean relatively dilute wash solutions. The pH of the wash solution is preferably less than about 5.5 and the amount of concentrated acid in the wash solution is suitably from about 5 cc. up to about 100 cc. per 5 gallons of wash solution. Acid concentrations above this amount will not be effective in reducing the density and can actually result in forming higher density particles than if the acid wash step is omitted. Preferably, the concentration of concentrated acid is from about 10 cc. up to about 50 cc. per 5 gallons of wash solution. A wide variety of acids, both organic and inorganic, may be suitably employed in the wash solution. Preferable acids comprise acetic acid, nitric acid and sulfuric acid.

The mild acid washed hydrogel particles are thereafter dried and calcined by the following procedure. The particles are first dried in air at about room temperature in the presence of moving air until the individual particles have become firm enough to roll freely on a flat surface. Thereafter the particles are contacted with dry air at a temperature of 100° C. for a period of from 1 hour to about 12 hours. When the drying is completed, the temperatures are gradually raised to within the range of from 350° C. to about 700° C. and preferably about 600° C. and maintained there for a period of from 1 hour to about 12 hours. After the calcining is completed, the silica is in the form of a low density particle of a size and shape desired for the finished zeolite. By low density, I mean that instead of the usual ABD of about 0.45 gm./cc. formed by directly drying the water washed particles without the mild acid wash, the ABD may be lowered as much as down to about 0.35 gm./cc. by washing the hydrogel particles with the dilute acid.

The particles are thereafter converted to a zeolite by contacting the calcined low density silica particles with an aqueous treating solution containing alkali metal aluminate (preferably sodium aluminate) the composition of said treating solution being established in relation to the original composition of said particles to incorporate alumina in the finished zeolite in the desired amounts. When it is desired to make a sieve having about a 5 Angstrom uniform pore opening (in the calcium form) preferably the weight ratio of silica/alumina in the finished particle is from 46/54 up to about 55/45. It is known that when silica particles having a definite size and shape have been reacted with the treating solution, a molecular rearrangement and reaction occurs within the particle thus forming a zeolite structure having substantially said definite size and shape. Therefore, the size and shape of the produced zeolite is substantially the size and shape of the calcined particle. When silica calcined particles are employed then a substantial weight of alumina must be incorporated into the particles without substantially increasing the size of the particle which means that the density of the particle must increase. It is apparent that if the density of the calcined particle is high the density of the zeolite particle will be correspondingly higher. I have found that when using a calcined silica particle having an ABD of 0.47 gm./cc. and producing a zeolite particle having a silica/alumina weight ratio of about 50/50, the zeolite particle has an ABD of about 1.08 gm./cc. This high ABD zeolite exhibits slow exchange rates and capacity when used to separate normal paraffins from hydrocarbon charge stocks. On the other hand, when the calcined silica particle has a lower ABD in the order of from about 0.35 up to about 0.40 and the same weight ratio zeolite is produced, the resulting zeolite particle exhibits satisfactory exchange rates and capacities.

The calcined particles are contacted with the treating solution at temperatures of from 25° C. to 150° C. and preferably 50° C. to 120° C. Generally, the higher the temperature the shorter is the required contacting time. The contacting times vary from a few minutes to several days although preferable times vary from 2 to 4 hours up to about 24 hours. For example, pure silica spheres whose diameter was substantially 1/16 of an inch were completely converted to a molecular sieve by contact with an aqueous solution of $NaAlO_2$ in less than 18 hours at 100° C. It is desirable that the treating solution have a high pH, greater than 11 and preferably greater than about 12 in order to effectively rearrange the calcined refractory oxide molecular structure into a zeolite crystal structure.

One factor in the determination of the zeolite type is the silica to alumina ratio. Thus in the formation of a given type zeolite the starting calcined particle and the treating solution must give to the finished zeolite a molecular ratio of silica to alumina to result in said given type. This means that the concentration and amount of aluminate ions in the treating solution is adjusted, in relation to the concentration of silica in the calcined particle to provide the proper silica to alumina ratio in the finished zeolite. For example, when producing Type A zeolite the silica/alumina weight ratio is selected within the range of from 46/54 to about 55/45. Therefore, especially when starting with a silica particle, an appreciable amount of alumina must be incorporated into the particle to produce Type A zeolite. Therefore, the lowering of the ABD of the calcined silica particle by the method described hereinbefore is especially important in producing therefrom a Type A zeolite particle. Other types of zeolites such as faujasite, etc., may be advantageously produced by the method of this invention.

After the zeolite particles have been separated from the treating solution, the alkali metal cations may be exchanged with other cations such as alkaline earth metal cations and especially calcium ions. This technique is effective in changing the size of the pore entrance. Commonly, the alkali metal cation is sodium which yields a Type A zeolite having pore entrances of about 4 Angstrom units. By ion exchanging a major portion of the sodium cations with calcium cations, the effective pore entrance size of the zeolite is increased to about 5 Angstrom units. These 5 Angstrom Type A zeolites are useful in separation of straight chain hydrocarbons from their branched chain isomers and cyclic analogs.

In a batch preparation method, after the particles have been converted to zeolites they may be separated from the spent treating solution by decanting off the spent solution or by using any other well-known method of separating a solid phase from a liquid phase. It is possible to convert the solid calcined particles to zeolites in a continuous process wherein the silica particles and fresh treating solution are continuously introduced into a contactor while spent treating solution and zeolites are continuously withdrawn from the contactor. It is also possible to employ a semi-continuous process such as that in which the treating solution is circulated from one tank to another, each tank containing solid particles at various stages of conversion to zeolite. It is also possible to use elevated pressures during the contacting step in order to accelerate the conversion of the silica particles to zeolite particles.

The zeolites produced by the method of this invention may be also employed as supports for catalysts. The zeolites produced by the method of this invention are a preferable carrier for a metal catalyst impregnated thereon because of their size, shape and uniformity. Spherically shaped catalyst particles are preferable since reactants that pass over a fixed bed of catalyst will pass over a more uniformly packed bed, thereby reducing channeling and allowing more efficient contact between said reactants and the catalyst. Furthermore, the uniformity, the surface area and the density of the catalyst particles are more easily controlled.

The following examples are presented to further illustrate the method of this invention, but it is not intended to limit the invention to the materials shown therein.

*Example 1*

A water glass (28.1 wt. percent $SiO_2$; 6.84 wt. percent Na) was diluted to about 16 wt. percent $SiO_2$ with water, chilled to about 45° F. and added to a chilled 19 wt. percent hydrochloric acid solution to attain about a silica acid hydrosol having a 1.1 Cl/Na mole ratio. A 28 wt. percent HMT solution was added to the hydrosol in a ratio of about 60 cc. of the dilute (28 wt. percent) HMT solution per 200 grams of $SiO_2$. The resulting mixture was pressured through a vibrating nozzle into forming oil maintained at about 95° C. to form sperical particles which when calcined will be about 1/32 of an inch in diameter. The hydrogel spherical particles were separated from the forming oil and split into a number of portions. A first portion, called Batch 1, was water washed with hot water (95° C.) to which 20 cc. of 28% ammonium hydroxide per 5 gallons of wash water was added for a period of about 4 hours. The Batch 1 spheres were then dried and calcined at 650° C. yielding spheres having an ABD (apparent bulk density) of about 0.47 gm./cc.

A second portion of the hydrogel spherical particles (called Batch 2) was washed in a dilute acetic acid solution (10 cc. of glacial acetic acid per 5 gallons of water) at temperatures of about 95° C. for a period of 8 hours. The Batch 2 spheres were then dried and calcined at 650° C. yielding spheres having an ABD of about 0.37 gm./cc.

A third portion of the hydrogel spherical particles (called Batch 3) was washed in a dilute sulfuric acid solution (10 cc. of 96 wt. percent sulfuric acid per 5 gallons of water) at temperatures of about 95° C. for a period of 8 hours. The Batch 3 spheres were then dried, and calcined at 650° C. yielding spheres having an ABD of about 0.37 gm./cc.

A fourth portion of the hydrogel spherical particles (called Batch 4) was washed in a dilute nitric acid solution (50 cc. of 70 wt. percent nitric acid per 5 gallons of water) at temperatures of about 95° C. for a period of 8 hours. The Batch 4 spheres were then dried, and calcined at 650° C. yielding spheres having an ABD of about 0.39 gm./cc.

A fifth portion of the hydrogel spherical particles (called Batch 5) was washed in a dilute acetic acid (50 cc. of glacial acetic acid per 5 gallons of water) at temperatures of about 95° C. for a period of about 8 hours. The Batch 5 spheres were then dried, and calcined at 650° C. yielding spheres having an ABD of about 0.38 gm./cc.

A separate lot of hydrogel spheres was prepared as described above except the HMT was eliminated and the acidified silica sol was directly introduced into the forming oil. This was accomplished by diluting a water glass to about a 14 wt. percent $SiO_2$ content and using about 3 wt. percent less HCl in the acidification. The acidified sol was pressurized through a vibrating nozzle into forming oil maintained at about 95° C. to form spherical particles which when calcined will be about 1/32 of an inch in diameter. The hydrogel particles were separated from the forming oil and split into two parts.

The first part, called Batch 6, was washed in a dilute sulfuric acid solution (10 cc. of 96 wt. percent sulfuric acid per 5 gallons of water) at temperatures of about 95° C. for a period of 5 hours. The Batch 6 spheres were then dried and calcined at 650° C. yielding spheres having an ABD of 0.75 gm./cc.

The second part, called Batch 7, was water washed with hot water (95° C.) to which 20 cc. of a 28% ammonium hydroxide per 5 gallons of wash water was added, for a period of about 4 hours. The Batch 7 spheres were then dried and calcined at 650° C. yielding spheres having an ABD of about 0.46 gm./cc.

It should be noted that the calcined silica spheres prepared without the mild acid wash (Batch 1) and the silica spheres prepared without the addition of the base releasing gelling agent such as HMT (Batch 6) yielded higher ABD spheres than those prepared with the HMT added to the sol and having a mild acid wash (Batches 2, 3, 4 and 5).

*Example 2*

The Batch 4 calcined spheres (ABD of 0.39) were loaded into a vessel and sufficient diluted sodium aluminate solution (12.6 wt. percent $Al_2O_3$ concentration) was added to produce an overall $SiO_2/Al_2O_3$ weight ratio of about 52.5/47.5. The resulting mixture also had a $Na_2O/Al_2O_3$ mole ratio of 1.5. The spheres and solution were contacted for about 2 hours at room temperature (about 70° F.) whereupon the solution was heated up and circulated through the vessel gradually raising the temperature up to about 210° F. over a 3-hour period. The spheres were contacted with the 210° F. solution for about 8 hours thereafter, whereupon the vessel was cooled and the spheres were separated from the spent solution. The spheres were then water washed hot (210° F.) with about 4.8 gallons of water per pound of $SiO_2$.

The spheres now in the form of sodium zeolite having uniform pore openings of about 4 Angstrom Units were contacted with a $CaCl_2$ solution at about 150° F. until about 2/3's of the sodium ions were ion exchanged with calcium. The spheres were then water washed and dried for 6 hours at about 240° F. yielding binderless spherical sieves having uniform pore openings of about 5 Angstrom units and a particle ABD of about 0.97 gm./cc.

The normal paraffin exchange rate of the 0.97 ABD sieve is evaluated in a dynamic test by loading 40 cc. of said sieves into a fixed bed. A first mixture of 16% n-tetradecane ($nC_{14}$) in isooctane is introduced into one end of the bed at 300 p.s.i.g., 232° C. and 3 LHSV. When the sieve cavaties are full of $nC_{14}$ as evidenced by a GLC analysis of the effluent from the other end of the fixed bed, a desorbent containing 16% n-decane ($nC_{10}$) in isooctane is introduced into said one end of the fixed bed at the above conditions to effect the displacement of $nC_{14}$ within the sieve cavities by $nC_{10}$. This is continued until the effluent contains no $nC_{14}$ by GLC analysis. The first mixture is thereupon reintroduced into said one end again until the effluent contains no $nC_{10}$. The steepness of the concentration gradient for the appearance of $nC_{14}$ in the effluent is analytically determined and taken as a measure of the rate of sorption of $nC_{14}$. Specifically, during the latter $nC_{14}$ displacing $nC_{10}$, it was found that 11.0 cc. of first mixture is required to be introduced into said one end for the concentration of $nC_{14}$ in the effluent to increase from 1.6% to 14.4% (these concentrations being the 10% point and the 90% point of the concentration of $nC_{14}$ in the first mixture). The volume of the first mixture required to change the effluent concentration from 10% to 90% of $nC_{14}$ (isooctane free basis) is taken as a measure of the rate of exchange of $nC_{14}$ displacing $nC_{10}$ from the sieves.

The normal paraffin exchange rate of the 1.08 ABD sieve is evaluated in the same dynamic test as described immediately above. It is found that 25.2 cc. of first mixture is required to be introduced into said one end for the concentration of $nC_{14}$ in the effluent to increase from 1.6% to 14.4%. Comparison of this result with the previous test shows the 0.97 ABD sieve to have at least twice as high a rate compared to the 1.08 ABD sieves on the basis of the volume of first mixture required. This higher rate is of significant importance in commercial operations to separate normal paraffins from hydrocarbon mixtures.

I claim as my invention:

1. A method for the preparation of zeolite particles having molecular sieve properties, which comprises forming silica hydrogel particles from a mixture of silica sol and from about 10 to about 15 grams of hexamethylenetetramine per 100 grams of $SiO_2$, washing said hydrogel particles at a temperature above about 50° C. for a time period of from about 1 to about 24 hours with an equeous acid solution having a pH of less than about 5.5 and containing from about 5 cc. to about 50 cc. of concentrated acid per 5 gallons of water, drying and calcining the thus washed hydrogel particles to form low density solid silica particles, and contacting said silica particles with an aqueous treating solution containing alkali metal cations and aluminate anions to form said zeolite particles.

2. The improved method of claim 1 further characterized in that the alkali metal is sodium.

3. The method of claim 2 further characterized in that the sol is an acidified water glass solution and the treating solution consists essentially of sodium aluminate.

4. The method of claim 1 further characterized in that the concentration of said aqueous acid solution is from 10 cc. to 50 cc. of concentrated acid per 5 gallons of water.

5. The method of claim 4 further characterized in that the acid is selected from the group consisting of acetic, nitric and sulfuric.

6. The method of claim 1 further characterized in that said silica hydrogen particles are made by preparing a water glass solution containing about 16 wt. percent $SiO_2$, chilling the diluted solution to about 45° F., adding the chilled solution to sufficient 19 wt. percent hydrochloric acid solution to attain about a 1.1 Cl/Na mole ratio, adding at 28 wt. percent hexamethylenetetramine solution to the resulting acidified chilled solution to attain the ratio of from about 10 to about 15 grams of hexamethylenetetramine per 100 grams of $SiO_2$, and dropping the hexamethylenetetramine-acidified solution into a forming oil maintained at about 95° F. in discreet particles.

7. The method of claim 6 further characterized in that the hydrogel particles are contacted with the aqueous acid solution at a temperature of about 95° F. for a period of time to attain calcined siilca particles having an apparent bulk density of from about 0.35 up to about 0.40 gm./cc.

8. The method of claim 1 further characterized in that:
the composition and amount of the treating solution are established in relation to the amount of silica particles to incorporate sufficient alumina in the finished zeolite to attain a silica/alumina weight ratio of from about 46/54 to about 55/45; and
maintaining said particles in contact with the treating solution until the particles are substantially converted to spherically shaped zeolite particles.

9. The method of claim 1 further characterized in that said silica sol mixture is formed into spherically shaped particles by the oil drop technique, whereby to produce said zeolite particles in the shape of spheres.

10. The method of claim 1 further characterized in that the composition and amount of said treating solution are correlated with the amount of silica particles to form a finished zeolite having a silica/alumina weight ratio of from about 46/54 to about 55/45.

References Cited
UNITED STATES PATENTS

| | | | |
|---|---|---|---|
| 2,645,619 | 7/1953 | Hoekstra | 252—448 |
| 2,882,244 | 4/1959 | Milton | 252—455 |
| 3,227,660 | 1/1966 | Hansford | 252—455 |

OSCAR R. VERTIZ, *Primary Examiner.*

EDWARD J. MEROS, *Examiner.*